United States Patent
Newton et al.

(10) Patent No.: US 6,565,063 B1
(45) Date of Patent: May 20, 2003

(54) HELICAL CHOKE FOR BRAKE VALVES

(75) Inventors: Ronald O. Newton, Adams, NY (US); William B. McCurdy, Jr., Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/051,120

(22) Filed: Jan. 22, 2002

(51) Int. Cl.[7] .............................................. F16K 47/12
(52) U.S. Cl. ...................................... 251/126; 251/127
(58) Field of Search ................................ 251/126, 127

(56) References Cited

U.S. PATENT DOCUMENTS

| | | | |
|---|---|---|---|
| 2,739,607 A | | 3/1956 | Murray |
| 2,824,573 A | | 2/1958 | Mason et al. |
| 3,247,967 A | * | 4/1966 | Kucmerosky ............... 251/126 |
| 3,323,535 A | | 6/1967 | Klemm et al. |
| 3,653,723 A | | 4/1972 | Worbois |
| 3,749,453 A | | 7/1973 | Wilson et al. |
| 3,918,769 A | * | 11/1975 | Worbois |
| 4,044,991 A | * | 8/1977 | Waller ........................ 251/126 |
| 4,495,965 A | * | 1/1985 | Ise .............................. 251/126 |
| 4,632,359 A | * | 12/1986 | Tooth .......................... 251/126 |
| 4,634,434 A | * | 1/1987 | Marino, Jr. et al. ......... 281/126 |
| 5,788,338 A | | 8/1998 | Hart et al. |

* cited by examiner

Primary Examiner—Paul J. Hirsch
(74) Attorney, Agent, or Firm—Barnes & Thornburg

(57) ABSTRACT

A choke for a brake control valve coming within the physical space limitation by forming a helical choke path. The choke includes a body having a passage and a plug in a passage. The helical path is created between and defined by the passage and the plug to form the choke. The length the passage is less an inch and the length of the plug is less than 0.25 inches. The body includes the first portion having an external thread and a stem portion. A filter is mounted on the stem portion. The first portion is mounted in a threaded opening in a first wall of the valve. The filter extends into an opening in a second wall of the valve and a cap mounted in the second opening contacts the filter and holds it secure on the stem.

16 Claims, 1 Drawing Sheet

HELICAL CHOKE FOR BRAKE VALVES

BACKGROUND AND SUMMARY INVENTION

The present invention relates generally to chokes and more specifically to a choke for a pneumatic brake control valve.

Pneumatic brake control valves, for example the DB60 available for New York Air Brake Corporation and other brake valves, include a number of chokes or restrictions which control the rate of flow from air pressure source to a chamber. With the increased use of electropneumatic brake control valves, the pneumatic portion has been redesigned. This redesign has resulted in severe space limitations while still requiring that the performance characteristic be met. For example, the flow of pressure of a reservoir into a control volume or chamber during an emergency brake application must have a controlled build-up slow enough to satisfy the 7 to 12 second rate requirement. This is the emergency reservoir to the control volume for the brake relay.

One of the factors that determines the flow rate of the valve is the diameter of the orifice and the length of the orifice. Experiments has shown that the size or effective diameter has a practical lower limit of about 0.020 inches. This yields about a 4.5 second rate. Increasing the choke length to ⅝ of an inch only increases the rate to a little over 5 seconds. Space limitations for the control valve prevents the length from being increased much if at all about a ⅝ of an inch. Not to mention, it is very difficult to manufacture a 0.020 inch by ⅝ of an inch hole.

The present invention provides an appropriate choke for a brake control valve coming within the physical space limitation by forming a helical choke path. The choke includes a body having a passage and a plug in a passage. The helical path is created between and defined by the passage and the plug to form the choke. The length the passage is less an inch and the length of the plug is less than 0.25 inches. The helical path is in the surface of one or both of the passage and the plug. The effective diameter of the helical path is below 0.02 inches. The length of the helical path is in the range of 1 to 4 inches. The plug is preferable press fitted into the passage.

The body includes the first portion having an external thread and a stem portion. The helical path is in the first portion which receives the plug. A filter is mounted on the stem portion. The stem includes a circumferential recess and a gasket in the recess. The stem portion may also have a polygonal exterior cross-section. The first portion is mounted in a threaded opening in a first wall of the valve. The filter extends into an opening in a second wall of the valve and a cap mounted in the second opening contacts the filter and holds it secure on the stem.

Other advantages and normal features the present invention will become apparent form the following detailed descriptions of the invention, when considered in conjunction with the drawings.

BRIEF DESCRIPTIONS OF THE DRAWINGS

DETAILED DESCRIPTION OF THE PREFERRED EMBODIMENTS

Figure 1:
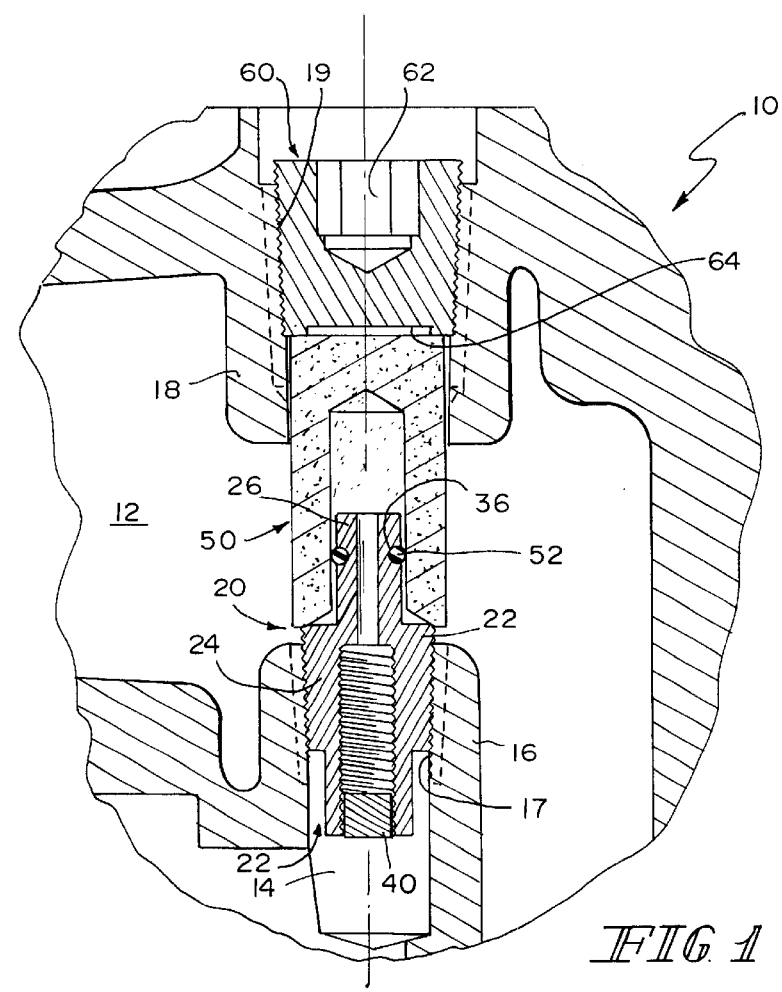
FIG. 1 is a cross-section view of a brake control valve including a choke incorporating the principles of the present invention.

A portion of a brake control valve 10 is illustrated in FIG. 1 and includes chambers 12 and 14 separated by a wall 16 and interconnected by a opening 17. The control valve 10 includes a second wall 18 having a opening 19. A choke 20 is secured in opening 17 between chambers 12 and 14. The choke 20 includes a body portion 22 and a plug 40 as illustrated in FIG. 1.

Figure 2:
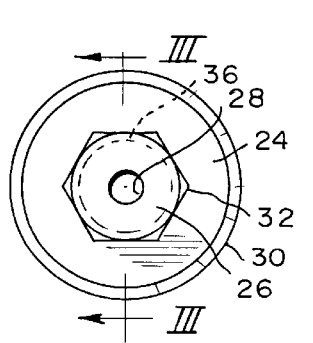
FIG. 2 is an end view of the choke body according to the principle of the present invention.
Figure 3:
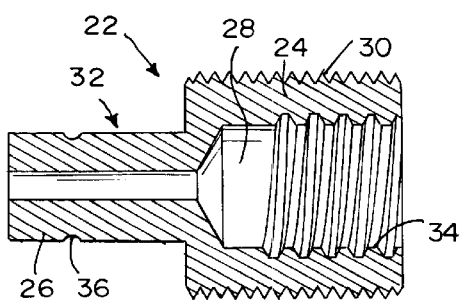
FIG. 3 is a cross-section of view of long lines III—III of FIG. 2.
Figure 4:
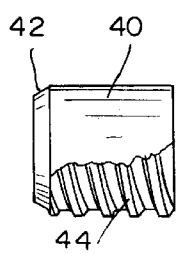
FIG. 4 is a side view of the plug according to the principles of the present invention.

As shown in detail in FIGS. 2, 3, and 4, the body 22 includes a first portion 24 and a stem portion 26. A passage 28 extends through both portions of the body 22. The first portion 24 includes an external thread 30. The exterior 32 of the stem 26 is polygonal in cross-section. As illustrated in FIG. 2 the polygon is a hexagonal. This allows a tool to engage the stem 26 through chamber 12 to screw the body 22 into opening 17 of wall 16.

At least a portion of the interior of the first portion 24 of the body 22 has a helical groove. This may be internal threading as illustrated in FIG. 3. The external surface of 32 of the stem 26 includes a circumferential recess 36, to receive a gasket or o-ring 52 as illustrated in FIG. 1.

The plug 40 includes a chamfered front surface 42 and may be smooth as illustrated in the top portion of FIG. 4 or may also be grooved or threaded at 44 as illustrated in the bottom half of FIG. 4. If the plug includes an external groove 44, the groove 34 of the body may be deleted, or the groove 44 may be used in combination with the grove 34. The exterior diameter of the plug 40 preferably is a little larger than the interior diameter of the threaded 34 such that the plug 40 is press fitted into the grooved portion 34 of the body 22. The helical path is created between the exterior of the plug 40 and the interior of portion of the body portion 24.

The length of the plug 40 determines that portion of the groove 34 which are used to create the helical path of the choke. The depths of the groove 34 defines the effective diameter of the path. Since the groove is V-shaped, the reference will made to the effective diameter since the path does not have a circular cross-section.

The length of the total passage 28 preferably is less than an inch. The length of the plug 40, preferably, is less than 0.25 inches. The effective diameter of the helical path formed between the interior of the passage 28 and the exterior of the plug 40, preferably, is below 0.02 inches. By properly selecting the length of the plug 40, the helical path can be in the range of 1 to 4 inches.

By way of example, the passage 28 in the first portion 24 of the body 22 was threaded using a ¼-20 UNC thread. This was reamed to 0.211/0.212 inches. The plug having an outside diameter of 0.214/0.213 inches and a length of 0.156 inches was inserted into the reamed opening. The effective area of the threaded portion 34 is equivalent to 0.015 diameter path and with the 0.156 long plug creates a 2.45 inch long choke. When installed in the brake valve 10, the build-up rate was measured at 9 seconds.

Because of the small diameter of the choke, a filter 50 is provided on the stem 32. The gasket 52 is received in the circumferial recess 36 of the stem 26 and the filter 50 is inserted thereon after the body 22 has been secured into opening 17 of wall 16. The filter 50 can be inserted through opening 19 in wall 18. Once the filter 50 is in place, a cap 60 is secured into opening 19. The cap 16 includes a hex recess 62 to receive a hex or allen wrench and is screwed down until it comes into contact or engages the filter 50. The end of the cap 60 includes a recess 64 to receive the filter 50. The filter may be a seventy micron filter for example.

Although the present invention has been described and illustrated in detail, it is to be clearly understood that the same is by way of illustration of example, and is not to be taken by way of limitation. The spirit and the scope of the present invention are to be limited only by the terms the appended claims.

What is claimed:

1. A brake valve having a control chamber and a choke connected to the control chamber, the choke comprising:

a body having a passage;

a plug in the passage;

a helical path between and defined by the passage and the plug forming the choke;

the length of the passage being less than one inch; and the length of the plug being less than 0.25 inches.

2. The valve of claim 1, wherein the helical path is in the surface of one or both of the passage and the plug.

3. The valve of claim 1, wherein the effective diameter of the helical path is below 0.02 inches.

4. The valve of claim 3, wherein the length of the helical path is in the range of one to four inches.

5. The valve of claim 1, wherein the length of the helical path is in the range of one to four inches.

6. The valve of claim 1, wherein the plug is press fitted in the passage.

7. The valve of claim 1, wherein the body includes a first portion having an external thread, a stem portion and an inlet for the choke being at the stem portion.

8. The valve of claim 7, wherein the helical path is in the first portion.

9. The valve of claim 7, including a filter at the inlet and mounted on the stem portion.

10. The valve of claim 9, wherein the stem includes a circumferential recess and a gasket in the recess.

11. The valve of claim 7, wherein the stem portion has a polygonal exterior cross-section.

12. A brake valve having a control chamber and a choke connected to the control chamber, the choke comprising:

a body having a passage extending through a first portion of the body and a stem portion of the body;

a plug in the passage in the first portion of the body;

a helical path between and defined by the passage and the plug forming the choke; and a filter mounted on the stem portion.

13. The valve of claim 12, wherein the stem includes a circumferential recess and a gasket in the recess.

14. The valve of claim 12, wherein the stem portion has a polygonal exterior cross-section.

15. The valve of claim 12, wherein the first portion has an external thread and is mounted in a threaded opening in a first wall of the valve.

16. The valve of claim 12, wherein the first portion is mounted in an opening in a first wall of the valve, the filter extends into an opening in a second wall of the valve and a cap mounted in the second opening and contacting the filter.

\* \* \* \* \*